United States Patent
Helm

(10) Patent No.: US 10,629,016 B1
(45) Date of Patent: Apr. 21, 2020

(54) VEHICLE CARGO CARRIER WITH MULTI-USER ACCESSIBILITY

(71) Applicant: Toyota Motor Engineering & Manufacturing North America, Inc., Plano, TX (US)

(72) Inventor: Sean L. Helm, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/268,216

(22) Filed: Feb. 5, 2019

(51) Int. Cl.

| | |
|---|---|
| *G05B 19/00* | (2006.01) |
| *G07C 9/00* | (2020.01) |
| *B60R 9/055* | (2006.01) |
| *B60R 9/06* | (2006.01) |
| *B60R 9/048* | (2006.01) |
| *E05B 81/56* | (2014.01) |
| *B60R 9/058* | (2006.01) |

(52) U.S. Cl.
CPC .......... *G07C 9/00896* (2013.01); *B60R 9/048* (2013.01); *B60R 9/055* (2013.01); *B60R 9/065* (2013.01); *E05B 81/56* (2013.01); *G07C 9/00309* (2013.01); *B60R 9/058* (2013.01); *E05Y 2900/53* (2013.01); *G07C 2009/0092* (2013.01); *G07C 2009/00769* (2013.01)

(58) Field of Classification Search
CPC ........... G07C 9/00896; G07C 9/00309; G07C 2009/00769; G07C 2009/0092; B60R 9/048; B60R 9/055; B60R 9/065; B60R 9/058; E05B 81/56; E05Y 2900/53

USPC ........................................................ 340/5.61
See application file for complete search history.

(56) References Cited

U.S. PATENT DOCUMENTS

| | | |
|---|---|---|
| 5,038,983 A | 8/1991 | Tomososki |
| 5,667,116 A | 9/1997 | Reinhart et al. |
| 6,234,371 B1 | 5/2001 | Sinn |
| 6,845,895 B2 | 1/2005 | Jones et al. |
| 7,055,896 B2 | 6/2006 | Ozkok et al. |
| 7,144,070 B2 | 12/2006 | Wiebe et al. |
| 7,699,372 B2 | 4/2010 | Adams et al. |
| 8,123,270 B2 | 2/2012 | Baccelli |
| 9,030,321 B2 | 5/2015 | Breed |

(Continued)

FOREIGN PATENT DOCUMENTS

WO   WO2016000042   1/2016

*Primary Examiner* — Zhen Y Wu
(74) *Attorney, Agent, or Firm* — Snell & Wilmer LLP

(57) ABSTRACT

Methods, systems, and apparatuses for managing cargo. A cargo carrier attaches to a vehicle and includes an interior cavity for storing one or more items. The cargo carrier includes a lock configured to secure the interior cavity. The cargo carrier includes a lock control unit configured to lock or unlock the lock. The cargo carrier includes a processor configured to receive an access communication via a transceiver identifying a first mobile device, and an access communication via the transceiver identifying a second mobile device. The processor is configured to receive an unlocking communication from the first mobile device, and in response transmit a communication to the lock control unit to cause the lock to be unlocked. The processor is configured to receive an unlocking communication from the second mobile device, and in response transmit a communication to the lock control unit to cause the lock to be unlocked.

17 Claims, 12 Drawing Sheets

(56) References Cited

U.S. PATENT DOCUMENTS

| | | |
|---|---|---|
| 9,150,158 B2 | 10/2015 | Reiber |
| 9,290,131 B2 | 3/2016 | Sautter et al. |
| 9,854,885 B2 | 1/2018 | Espig |
| 10,424,143 B2* | 9/2019 | Miller ................. G07C 9/00912 |
| 2004/0054436 A1* | 3/2004 | Haitin ................... A61G 12/001 |
| | | 700/236 |
| 2005/0242930 A1* | 11/2005 | Nicolson ............. B60R 25/1001 |
| | | 340/426.36 |
| 2008/0053340 A1* | 3/2008 | Comeaux ............... A47B 21/03 |
| | | 108/44 |
| 2009/0141117 A1* | 6/2009 | Elberbaum ......... G07C 9/00571 |
| | | 348/14.04 |
| 2010/0320245 A1 | 12/2010 | Vilkomirski et al. |
| 2011/0074541 A1* | 3/2011 | Jones ................. G07C 9/00103 |
| | | 340/5.61 |
| 2012/0018474 A1 | 1/2012 | Lindberg et al. |
| 2012/0055967 A1* | 3/2012 | McMillan ............... B60R 3/007 |
| | | 224/315 |
| 2015/0356801 A1* | 12/2015 | Nitu .................... G07C 9/00912 |
| | | 340/5.61 |
| 2017/0186258 A1* | 6/2017 | Sharma ............... G08B 13/1654 |
| 2017/0323503 A1* | 11/2017 | Garcia ............... G07C 9/00309 |
| 2018/0101820 A1* | 4/2018 | Peynet ............... G06Q 10/0836 |
| 2018/0165902 A1* | 6/2018 | Wilkinson ............... F25D 23/06 |
| 2018/0190054 A1* | 7/2018 | Perez ................. G07C 9/00309 |
| 2018/0197141 A1* | 7/2018 | Venture ............. G06Q 10/0836 |
| 2018/0235843 A1* | 8/2018 | Latorraca ................ G07F 11/62 |
| 2018/0256427 A1* | 9/2018 | Volek ...................... A47B 31/00 |
| 2019/0049995 A1* | 2/2019 | Ferguson ........... B60H 1/00364 |
| 2019/0051090 A1* | 2/2019 | Goldberg ............... G06Q 50/12 |
| 2019/0057566 A1* | 2/2019 | Mlynarczyk ......... G06Q 10/087 |
| 2019/0130349 A1* | 5/2019 | Ferguson ......... G06Q 10/08355 |
| 2019/0133888 A1* | 5/2019 | Lam ........................ A61J 7/049 |
| 2019/0164639 A1* | 5/2019 | Saaraswat ............... G16H 20/13 |
| 2019/0270398 A1* | 9/2019 | Goldberg ......... G06Q 10/08355 |
| 2019/0279130 A1* | 9/2019 | Blank ............. G06Q 10/06398 |

\* cited by examiner

VEHICLE CARGO CARRIER WITH MULTI-USER ACCESSIBILITY

BACKGROUND

1. Field

The invention relates to a system and a method for managing access to a vehicle cargo carrier.

2. Description of the Related Art

Vehicles may store items in an interior area of the vehicle, such as a back seat or a trunk. However, there may only be limited area within the vehicle for cargo. In order to store more cargo, additional containers attached to an exterior of the vehicle may be used. For example, a cardboard box or a plastic container may be filled with cargo and elastic cables may be used to tie these containers to a roof rack of a vehicle. Pickup trucks may also store these containers in the truck bed of the pickup truck. In this way, the cargo carrying capacity of the vehicle is improved. However, the cargo carried in these containers are vulnerable to theft, as these containers are located exterior to the vehicle. Thus, there is a need for improved devices for storing cargo.

SUMMARY

What is described is a cargo carrier for attaching to an exterior of a vehicle. The cargo carrier includes an interior cavity for storing one or more items. The cargo carrier also includes a lock configured to secure the interior cavity and be in a locked state or an unlocked state. The cargo carrier also includes a lock control unit configured to lock or unlock the lock. The cargo carrier also includes a processor connected to the lock control unit. The processor is configured to receive an access communication via a transceiver identifying a first mobile device. The processor is configured to receive an access communication via the transceiver identifying a second mobile device. The processor is configured to receive an unlocking communication from the first mobile device. The processor is configured to transmit a communication to the lock control unit to cause the lock to be in the unlocked state to allow the interior cavity to be exposed. The processor is configured to receive an unlocking communication from the second mobile device. The processor is configured to transmit a communication to the lock control unit to cause the lock to be in the unlocked state to allow the interior cavity to be exposed.

Also described is a cargo carrier for attaching to an exterior of a vehicle. The cargo carrier includes a plurality of compartments configured to store one or more items. The cargo carrier also includes a respective plurality of locks corresponding to the plurality of compartments, each lock configured to secure a respective compartment. The cargo carrier includes a lock control unit configured to lock or unlock any lock of the plurality of locks. The cargo carrier also includes a processor connected to the lock control unit. The processor is configured to receive an assignment communication via a transceiver identifying a mobile device and a compartment from the plurality of compartments. The processor is also configured to associate the compartment and the mobile device when the compartment is unassigned. The processor is also configured to receive an unlocking communication via the transceiver to unlock the compartment. The processor is also configured to transmit a communication to the lock control unit to unlock the compartment.

Also described is a method for managing access to a cargo carrier attached to an exterior of a vehicle. The method includes receiving, by a transceiver, a communication identifying a first mobile device. The method includes receiving, by the transceiver, a communication identifying a second mobile device. The method includes receiving, by the transceiver, an unlocking communication from the first mobile device. The method includes instructing, by a processor, a lock control unit to cause a lock of the cargo carrier to be in an unlocked state. The method includes receiving, by the transceiver, an unlocking communication from the second mobile device. The method includes instructing, by the processor, the lock control unit to cause the lock of the cargo carrier to be in the unlocked state.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Figure 1A:
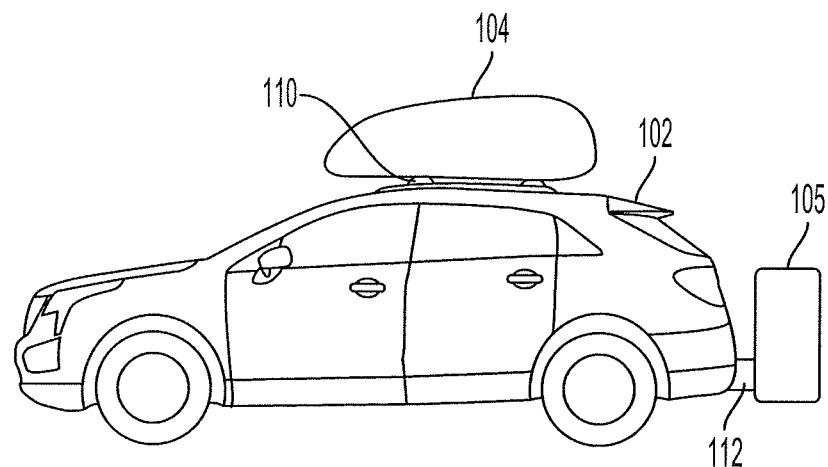
FIG. 1A illustrates a vehicle using a vehicle cargo carrier on top of the vehicle and attached to a trailer hitch of the vehicle, according to various embodiments of the invention.

Disclosed herein are systems, vehicles, and methods for managing access to a vehicle cargo carrier. As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

Conventional boxes or containers that are attached to a vehicle, either in a truck bed or strapped to a roof rack, are vulnerable to theft. These conventional boxes and containers are not located within the interior of the vehicle, and if an individual were to open the containers to rummage through the contents of the containers, there would be no alarm activated, whereas if the container was inside a locked vehicle, the individual would trigger an alarm while attempting to access the container.

Containers with locks may be used. However, in situations where the storage space of the container is shared amongst multiple individuals, conventional locks may be problematic. When the lock is a key lock, there may be a limited number of keys available, limiting the number of individuals who can share the container. When the lock is a combination lock, the container owner may not be able to control the sharing of the combination, and container security may become a concern. Conventional locks may have to be changed periodically for safety reasons. Frequently changing a lock may become expensive.

The systems and methods described herein use a cargo carrier capable of communicating with the vehicle the cargo carrier is attached to. When the cargo carrier detects an attempt to circumvent the lock of the cargo carrier, the vehicle alarm may be activated. The cargo carrier used in the systems and methods described herein is also capable of communicating with multiple mobile devices, and monitoring access to the cargo carrier via the mobile devices. Access may be granted and revoked without use of combinations or keys. In addition, when mobile devices are used to access the cargo carrier, a log may be maintained of who accessed the cargo carrier and when the cargo carrier was accessed.

The cargo carriers described herein are special-purpose devices used to store items and be attached to a vehicle. The cargo carriers described herein have features to integrate the cargo carrier with the vehicle, making the cargo carrier a more specialized device as compared to a conventional box or other conventional storage device. The cargo carriers described herein include one or more connectors that allow the cargo carrier to be securely connected to an exterior of a vehicle, which may not be possible with a conventional box or other conventional storage devices.

The cargo carriers described herein may be used when multiple users are sharing use of the cargo carrier or when the cargo carrier is being used on multiple vehicles where access is given on a limited basis or a limited time. For example, in a situation where the vehicle is shared by multiple users each entering and departing the vehicle at different times, the cargo carrier may be shared. In another example, when a single cargo carrier is used on multiple vehicles, communication between the cargo carrier and each vehicle may be permitted on a limited basis or for a limited time.

FIG. 1A illustrates a first vehicle 102 that is a sport utility vehicle. The first vehicle 102 has a cargo carrier 104 attached to a roof rack 110 of the first vehicle 102. The first vehicle 102 also has a cargo carrier 105 attached to a trailer hitch 112. While the first vehicle 102 is shown as being a sport utility vehicle, the first vehicle 102 may be any vehicle capable of having a cargo carrier attached to the vehicle at an exterior location.

Figure 1B:
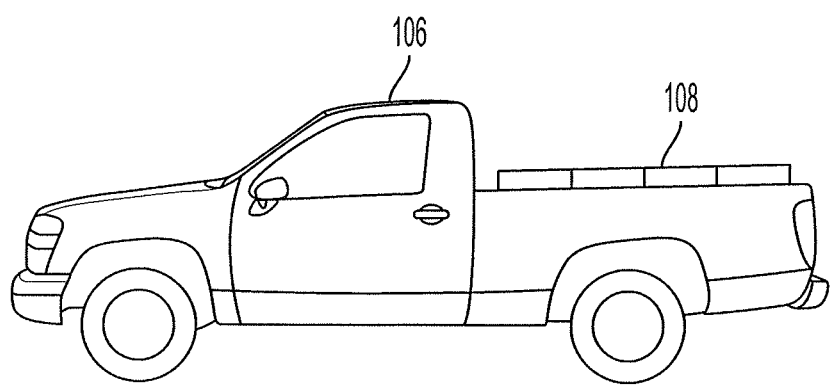
FIG. 1B illustrates a vehicle using a vehicle cargo carrier in the truck bed of the vehicle, according to various embodiments of the invention.

FIG. 1B illustrates a second vehicle 106 that is a pickup truck. The second vehicle 106 has a cargo carrier 108 that is attached to one or more truck bed connection points located within the truck bed. As illustrated by the first vehicle 102 and the second vehicle 106, the cargo carriers 104, 105, and 108 are attached to their respective vehicles on an exterior connection point. Unlike storage areas within the passenger cabin of the vehicle or the trunk of the vehicle that are located on the interior of the vehicle, the cargo carriers 104, 105, and 108 are capable of being accessed by an individual who does not need access to the interior of the vehicle. Thus, the items within the cargo carriers, or the cargo carriers themselves, are vulnerable to theft.

Conventional vehicles are not communicatively coupled to the cargo carriers, and if conventional cargo carriers were to be broken into or removed from conventional vehicles, the alarm of the conventional vehicle would not be activated. However, the cargo carriers described herein are communicatively coupled to their respective vehicles, and the vehicle may monitor the status of the cargo carrier, and take appropriate action, as described herein.

Figure 1C:
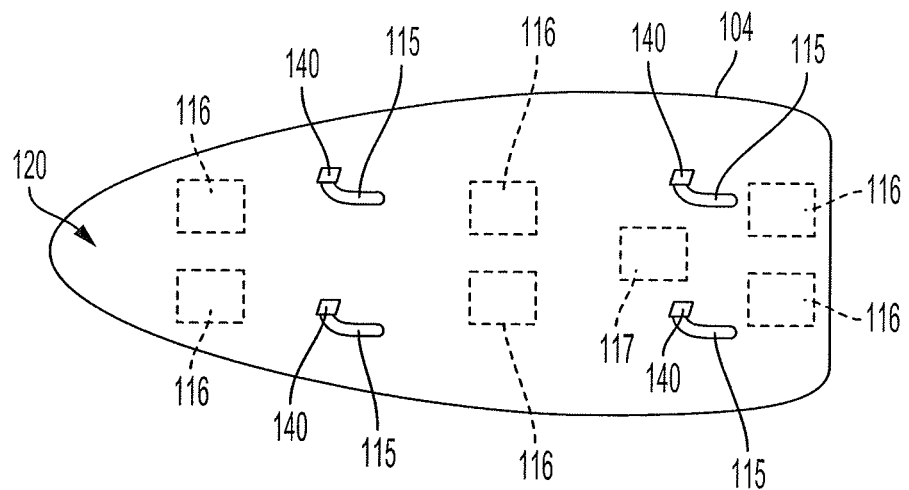
FIG. 1C illustrates a bottom side of the vehicle cargo carrier, according to various embodiments of the invention.

FIG. 1C illustrates a bottom side of the cargo carrier 104 of FIG. 1A. The cargo carrier 104 has a bottom side 120 that faces the vehicle 102. The cargo carrier 104 may have one or more connectors 115 for engaging a part of the vehicle 102. The connectors 115 may be brackets or arms configured to engage a roof rack 110 of the vehicle 102. The connectors 115 may be located on the bottom side 120 of the cargo carrier 104 and may protrude from the cargo carrier 104. The cargo carrier 104 may also have one or more locks 140 corresponding to each of the connectors 115. Each lock 140 may be configured to ensure that its respective connector 115 remains in a locked and engaged state until the lock 140 is unlocked. The lock 140 may be unlocked by a physical key or by an electronic signal that is an instruction to unlock the lock 140.

The cargo carrier 104 also includes one or more sensors 116. The one or more sensors 116 are configured to detect various types of data associated with the cargo carrier 104. The sensors 116 may include one or more weight sensors configured to detect weight data associated with the cargo carrier 104. The weight data may be analyzed to determine whether the contents of the cargo carrier 104 have shifted significantly. The sensors 116 may also include a temperature sensor configured to detect temperature data within the cargo carrier 104. The temperature data may be used to determine whether a temperature inside of the cargo carrier 104 has exceeded a threshold temperature. The sensors 116 may also include an image sensor configured to detect image data within the cargo carrier 104. The image data may be used to visually monitor the interior of the cargo carrier 104 and/or to visually monitor who has accessed the cargo carrier 104. The sensors 116 may also include a lock sensor configured to detect whether the cargo carrier 104 is in a locked or unlocked state. The sensors 116 may also include an opening sensor configured to detect whether the cargo carrier 104 is open or closed. The sensors 116 may also include a moisture sensor configured to detect moisture data within the cargo carrier 104. The moisture data may be used to determine whether any moisture is affecting the contents of the cargo carrier 104.

The cargo carrier 104 also includes a transceiver 117 configured to communicate and receive data with the vehicle 102. The cargo carrier 104 may communicate any of the sensor data described herein to the vehicle 102. The vehicle 102 may analyze the sensor data and determine one or more actions based on the sensor data. For example, when the sensor data indicates that the lock sensors detect unauthorized opening of the cargo carrier 104, the vehicle 102 may activate a vehicle alarm system and/or send a warning communication to a mobile device of the driver. In another example, when the moisture data indicates that there is moisture within the cargo carrier 104 exceeding a moisture threshold, the vehicle 102 may provide a moisture warning on a display screen within the vehicle 102 indicating that excess moisture has been detected. The vehicle 102 may also send a warning communication to the mobile device of the driver.

The sensors 116 may be integrated into the cargo carrier 104 or may be attached to a third-party cargo carrier 104. Similarly, the transceiver 117 may be integrated into the cargo carrier 104 or may be attached to a third-party cargo carrier 104.

Figure 1D:
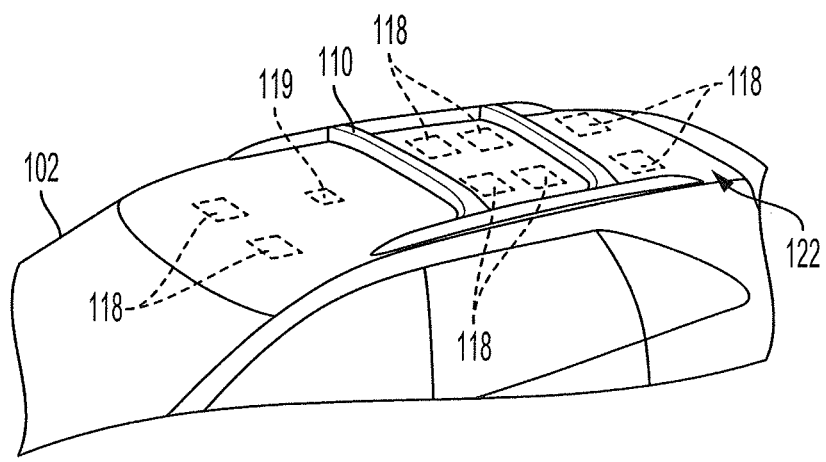
FIG. 1D illustrates a view of the roof of a vehicle, according to various embodiments of the invention.

FIG. 1D illustrates a view of the roof of a vehicle 102. The roof of the vehicle 102 may be a top surface 122 of the vehicle 102. There may be roof racks 110 located along the roof of the vehicle and configured to engage with or be engaged by one or more connectors (e.g., connectors 115) of the cargo carrier 104. The vehicle 102 may also include a transceiver 119 configured to transmit and receive data with the cargo carrier 104.

The vehicle 102 may include one or more sensors 118 that contact the cargo carrier 104 or are located within a sensing distance of the cargo carrier 104. The sensors 118 may be configured to detect cargo carrier data. The cargo carrier data may include any data associated with the cargo carrier 104 that is capable of being detected from outside of the cargo carrier 104. The sensors 118 may include one or more weight sensors configured to detect weight data associated with the cargo carrier 104. The weight data may be analyzed to determine whether the contents of the cargo carrier 104 have shifted significantly. The sensors 118 may also include a temperature sensor configured to detect temperature data of the cargo carrier 104. The temperature data may be used to determine whether a temperature inside of the cargo carrier 104 has exceeded a threshold temperature. The data capable of being detected by the sensors 118 may not be as robust as the data capable of being detected by the sensors 116 of the cargo carrier 104, but the sensors 118 may be able to provide insight on the status of the cargo carrier 104 when the cargo carrier 104 does not have any sensors 116. In some embodiments, the sensors 118 of the vehicle 102 complement the sensors 116 of the cargo carrier 104.

Figure 1E:
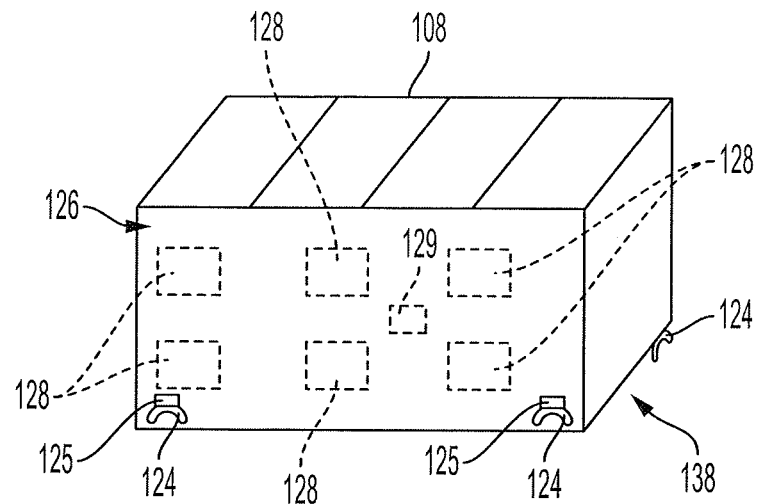
FIG. 1E illustrates a bottom side of the vehicle cargo carrier, according to various embodiments of the invention.

FIG. 1E illustrates a bottom side of the cargo carrier 108 of FIG. 1B. The cargo carrier 108 has a bottom side 126 that faces the vehicle 106. In particular, the bottom side 126 may face the truck bed of the vehicle 106. The cargo carrier 108 may have one or more connectors 124 for engaging a part of the vehicle 106. The connectors 124 may be brackets or arms configured to engage corresponding connection points of the vehicle 106. The connectors 124 may be located on the bottom side 126 of the cargo carrier 108 and/or a side 138 of the cargo carrier 108 and may protrude from the cargo carrier 108. The cargo carrier 108 may also have one or more locks 125 corresponding to each of the connectors 124. Each lock 125 may be configured to ensure that its respective connector 124 remains in a locked and engaged state until the lock 125 is unlocked. The lock 125 may be unlocked by a physical key or by an electronic signal that is an instruction to unlock the lock 125.

The cargo carrier 108 also includes one or more sensors 128. The one or more sensors 128 are configured to detect various types of data associated with the cargo carrier 108. The sensors 128 may include one or more weight sensors configured to detect weight data associated with the cargo carrier 108. The weight data may be analyzed to determine whether the contents of the cargo carrier 108 have shifted significantly. The sensors 128 may also include a temperature sensor configured to detect temperature data within the cargo carrier 108. The temperature data may be used to determine whether a temperature inside of the cargo carrier 108 has exceeded a threshold temperature. The sensors 128 may also include an image sensor configured to detect image data within the cargo carrier 108. The image data may be used to visually monitor the interior of the cargo carrier 108 and/or to visually monitor who has accessed the cargo carrier 108. The sensors 128 may also include a lock sensor configured to detect whether the cargo carrier 108 is in a locked or unlocked state. The sensors 128 may also include an opening sensor configured to detect whether the cargo carrier 108 is open or closed. The sensors 128 may also include a moisture sensor configured to detect moisture data within the cargo carrier 108. The moisture data may be used to determine whether any moisture is affecting the contents of the cargo carrier 108.

The cargo carrier 108 also includes a transceiver 129 configured to communicate and receive data with the vehicle 106. The cargo carrier 108 may communicate any of the sensor data described herein to the vehicle 106. The vehicle 106 may analyze the sensor data and determine one or more actions based on the sensor data, as described herein.

The sensors 128 may be integrated into the cargo carrier 108 or may be attached to a third-party cargo carrier 108. Similarly, the transceiver 129 may be integrated into the cargo carrier 108 or may be attached to a third-party cargo carrier 108.

Figure 1F:
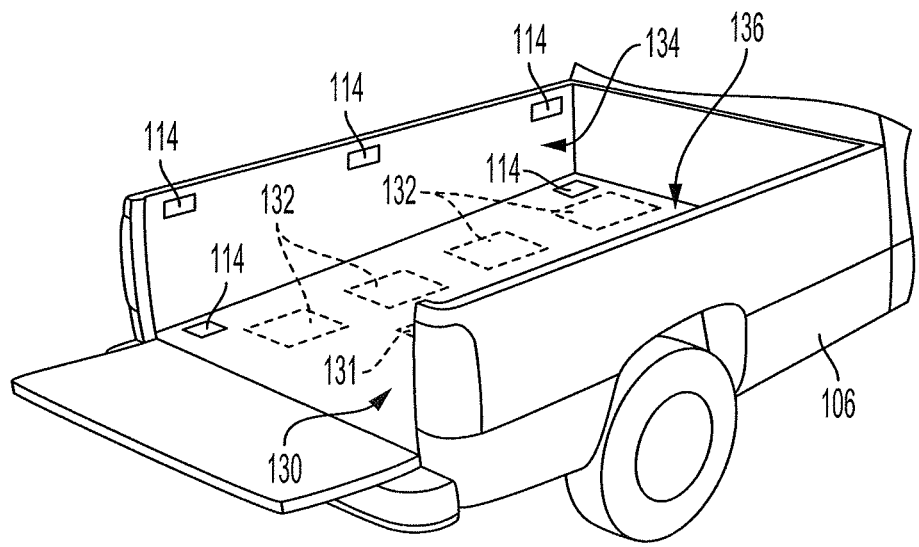
FIG. 1F illustrates a view of the truck bed of a vehicle, according to various embodiments of the invention.

FIG. 1F illustrates a view of the truck bed 136 of a vehicle 106. There may be connection points 114 located along a side 134 of the truck bed 136 of the vehicle or located along a bottom surface 130 of the truck bed 136. The connection points 114 are configured to engage with or be engaged by one or more connectors (e.g., connectors 124) of the cargo carrier 108. The vehicle 106 may also include a transceiver 131 configured to transmit and receive data with the cargo carrier 108.

The vehicle 106 may include one or more sensors 132 that contact the cargo carrier 108 or are located within a sensing distance of the cargo carrier 108. The sensors 132 may be configured to detect cargo carrier data. The cargo carrier data may include any data associated with the cargo carrier 108 that is capable of being detected from outside of the cargo carrier 108. The sensors 132 may include one or more weight sensors configured to detect weight data associated with the cargo carrier 108. The weight data may be analyzed to determine whether the contents of the cargo carrier 108 have shifted significantly. The sensors 132 may also include a temperature sensor configured to detect temperature data of the cargo carrier 108. The temperature data may be used to determine whether a temperature inside of the cargo carrier 108 has exceeded a threshold temperature. The data capable of being detected by the sensors 132 may not be as robust as the data capable of being detected by the sensors 128 of the cargo carrier 108, but the sensors 132 may be able to provide insight on the status of the cargo carrier 108 when the cargo carrier 108 does not have any sensors 128. In some embodiments, the sensors 132 of the vehicle 106 complement the sensors 128 of the cargo carrier 108.

Figure 2:
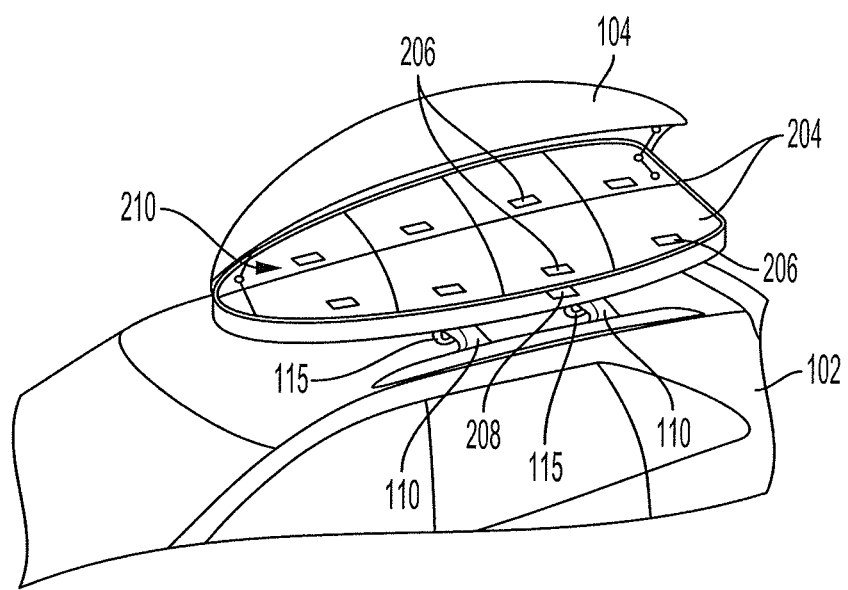
FIG. 2 illustrates an interior view of a vehicle cargo carrier, according to various embodiments of the invention.

FIG. 2 shows a cargo carrier 104 in an open state. The cargo carrier 104 is connected to the vehicle 102. The cargo carrier 104 has connectors 115 that attach to the roof racks 110 of the vehicle 102. The connectors 115 may be locked after engaging the roof racks 110.

The cargo carrier 104 may have an interior cavity 210. In some embodiments, the interior cavity 210 is one large compartment for storing cargo. In some embodiments, the interior cavity 210 includes multiple compartments 204, as illustrated in FIG. 2. The multiple compartments 204 may be used in various ways. In some embodiments, when multiple individuals are sharing a ride in the vehicle 102, the multiple compartments 204 may be used to separate the respective cargo of the multiple individuals.

Each of the multiple compartments 204 may have a lock 206 associated with the compartment 204. The lock 206 for each compartment 204 may be configured to secure the contents of the compartment 204 and prevent unauthorized access to the compartment 204. In other embodiments, the multiple compartments 204 do not have individual locks. The cargo carrier 104 may also have a lock 208 configured to secure access to the interior cavity 210 of the cargo carrier 104.

As will be described in further detail herein, the locks 206 associated with the compartments 204 may be locked and unlocked remotely using a keyfob or a mobile device. The keyfob may be a remote keyless entry keyfob associated with the vehicle 102. In some embodiments, when the compartments 204 store items of multiple different individuals, each individual may be able to unlock their respective compartment 204 using their mobile device. In this way, no one individual may have access to all of the compartments 204 of the cargo carrier 104, and the cargo carrier 104 may be shared without concern of theft from other users.

In some embodiments, when the interior cavity 210 does not have multiple lockable compartments, the access to the interior cavity 210 is restricted by the lock 208. In these embodiments, multiple individuals who are sharing use of the cargo carrier 104 may all have access to the shared space within the interior cavity, and the multiple users may use their respective mobile devices to unlock the lock 208 to access the interior cavity 210.

If a sensor of the lock 206 detects that the lock 206 is being tampered with in an effort to open the compartment 204 without providing access credentials, one or more alarms, including the theft alarm of the vehicle 102 may be activated. Similarly, if a sensor of the lock 208 detects that the lock 208 is being tampered with in an effort to open the cargo carrier 104 without providing access credentials, one or more alarms, including the theft alarm of the vehicle 102 may be activated.

Further still, locks (e.g., locks 140) associated with the connectors 115 of the cargo carrier 104 may be locked and unlocked remotely using a keyfob or a mobile device. If a sensor of the locks 140 detects that the lock 140 is being tampered with in an effort to remove the cargo carrier 104 from the vehicle 102 without providing access credentials, one or more alarms, including the theft alarm of the vehicle 102, may be activated. The connectors 115 may be locked or unlocked with a mobile device or keyfob when the cargo carrier 104 is moved from one vehicle to another.

In some embodiments, a log of access to the cargo carrier 104 and each compartment 204 may be maintained. The log may be referenced at a later time to determine when access to the cargo carrier 104 and/or the compartments 204 was granted and to whom. The log may be stored locally on the vehicle 102, on a remote data server, or across multiple devices in a distributed ledger (e.g., a blockchain).

In some embodiments, a camera may be located within the interior cavity 210 of the cargo carrier 104 and may be configured to detect image data within the interior cavity 210 of the cargo carrier 104. The camera may be triggered to detect image data when any of the locks 140, 206, 208 are locked and/or unlocked or when any of the locks 140, 206, 208 are tampered with.

Figure 3:
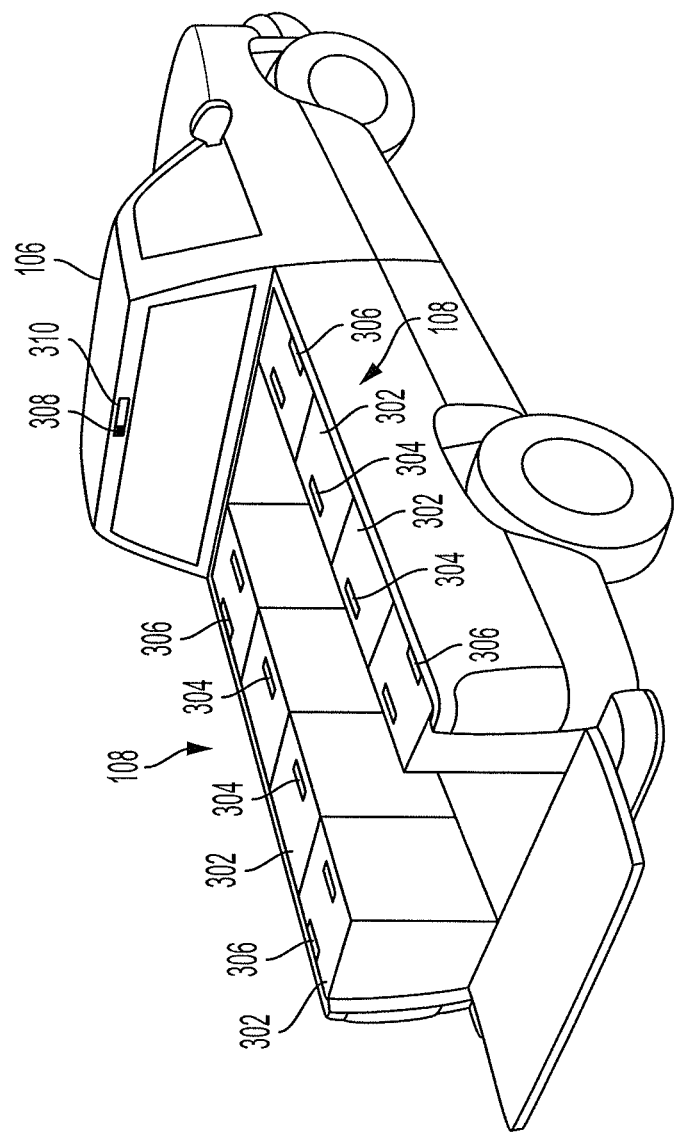
FIG. 3 illustrates a view of a vehicle cargo carrier for a pickup truck, according to various embodiments of the invention.

FIG. 3 shows a cargo carrier 108 of a vehicle 106 that is a pickup truck. The cargo carrier 108 is connected to the vehicle 106 at one or more locations in the truck bed, such as tie down points. There may be one or more locks 306 securing the cargo carrier 108 to the vehicle 106. While the locks 306 are shown as being located near the top side of the cargo carrier 108, they may be located at any location, including on the connectors connecting the cargo carrier 108 to the vehicle 106.

In some embodiments, the cargo carrier 108 has a single, large compartment. In some embodiments, the cargo carrier 108 includes multiple compartments 302. The multiple compartments 302 may be used in various ways. In some embodiments, when multiple individuals are sharing a ride in the vehicle 106, the multiple compartments 302 may be used to separate the respective cargo of the multiple individuals.

When the cargo carrier has multiple compartments 302, each of the multiple compartments 302 may have a lock 304 associated with the compartment 302. The lock 304 for each compartment 302 may be configured to secure the contents of the compartment 302 and prevent unauthorized access to the compartment 302. When the cargo carrier has a single, large compartment or multiple compartments that do not have individual locks, a single lock may be used to secure the contents of the cargo carrier 108. Operationally, the single lock may be similar to the lock 304 of each compartment 302.

As will be described in further detail herein, the locks 304 associated with the compartments 302 may be locked and unlocked remotely using a keyfob or a mobile device. The keyfob may be a remote keyless entry keyfob associated with the vehicle 106. In some embodiments, when the compartments 302 store items of multiple different individuals, each individual may be able to unlock their respective compartment 302 using their mobile device. In this way, no one individual may have access to all of the compartments 302 of the cargo carrier 108, and the cargo carrier 108 may be shared without concern of theft from other users.

In some embodiments, when the cargo carrier 108 does not have multiple lockable compartments, the access to the cargo carrier is restricted by one or more locks that all lock or unlock together. In these embodiments, multiple individuals who are sharing use of the cargo carrier 108 may all have access to the shared space within the cargo carrier 108, and the multiple users may use their respective mobile devices or keyfobs to unlock the one or more locks to access the interior cavity of the cargo carrier 108.

The locks 306 associated with the cargo carrier 108 may be locked and unlocked remotely using a keyfob or a mobile device.

If a sensor of the lock 304 detects that the lock 304 is being tampered with in an effort to open the compartment 302 without providing access credentials, one or more alarms, including the theft alarm of the vehicle 106 may be activated. If a sensor of the lock 306 detects that the lock 306 is being tampered with in an effort to remove the cargo carrier 108 without providing access credentials, one or more alarms, including the theft alarm of the vehicle 106 may be activated. When the cargo carrier 108 does not have multiple lockable compartments, when a sensor detects that a lock of the cargo carrier 108 is being tampered with in an effort to open the cargo carrier 108 without providing access credentials, one or more alarms, including the theft alarm of the vehicle 106 may be activated.

In some embodiments, a log of access to the cargo carrier 108 and each compartment 302 may be maintained. The log may be referenced at a later time to determine when access to the cargo carrier 108 and/or the compartments 302 was granted and to whom. The log may be stored locally on the vehicle 106, on a remote data server, or across multiple devices in a distributed ledger (e.g., a blockchain).

In some embodiments, a camera 308 of the vehicle 106 may be directed toward the cargo carrier 108. The camera 308 may be configured to detect image data associated with the truck bed and the cargo carrier 108. The camera 308 may be triggered to detect image data when any of the locks 304, 306 are locked and/or unlocked or when any of the locks 304, 306 are tampered with. There may also be a lighting device 310 configured to provide illumination to assist the camera 308 in detecting image data.

FIGS. 4A-4F illustrate a process for accessing a compartment of a cargo carrier having multiple lockable compartments, as described herein. A set 402 of compartments 404A-404C are shown. The set 402 may be included in the interior cavity 210 of the cargo carrier 104 of FIG. 2 or may be included in the cargo carrier 108 of the vehicle 106 of FIG. 3. While only three compartments 404A-404C are shown in FIGS. 4A-4F, the process may be used with any number of compartments and mobile devices.

Figure 4A:
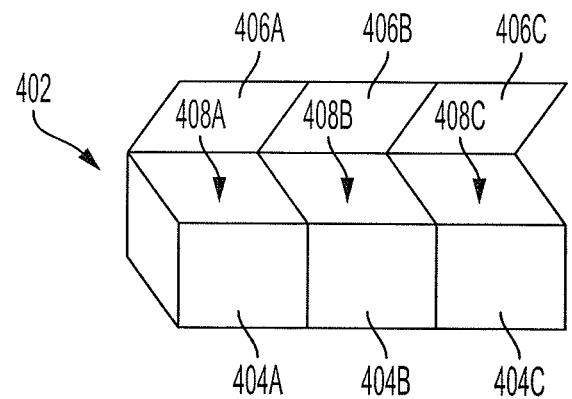
FIGS. 4A-4F illustrate use of the vehicle cargo carrier to monitor and regulate access to the compartments of the vehicle cargo carrier, according to various embodiments of the invention.

As shown in FIG. 4A, the set 402 includes compartments 404A-404C, which are in an open state. Each compartment 404 has a corresponding cavity 408 and a lid 406. That is, compartment 404A has a cavity 408A and a lid 406A, compartment 404B has a cavity 408B and a lid 406B, and compartment 404C has a cavity 408C and a lid 406C. In some embodiments, a camera and/or a light is associated with each compartment 404 and configured to be activated when the compartment is unlocked.

Figure 4B:
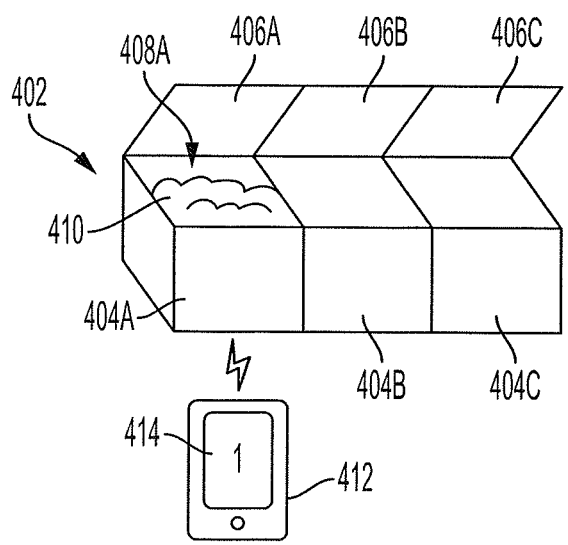

As shown in FIG. 4B, the first compartment 404A has one or more items (or cargo) 410 placed in the first cavity 408A. The first compartment 404A may be used by a first user, who may be an occupant of the vehicle that the cargo carrier is attached to. The first user may have a first mobile device 412 (e.g., a smartphone). The first mobile device 412 may be capable of exchanging data with the vehicle and/or the cargo carrier. The first mobile device 412 may perform one or more authentication steps to pair with the vehicle and/or the cargo carrier. These one or more authentication steps may include exchanging of tokens or encryption keys.

Once the first mobile device 412 and the vehicle and/or cargo carrier are configured to exchange data, the first mobile device 412 may transmit an assignment communication identifying which compartment 404 the user of the first mobile device 412 would like to use to store the user's items 410 and also identifying the first mobile device 412 or an identifier of the user. In some embodiments, each compartment 404 has an identifier written on the compartment 404, such as a number (e.g., Compartment 1), a code (e.g., AE16MK27) or a scannable QR code. If the particular compartment identified by the first user via the first mobile device 412 is unoccupied or unassigned, the particular compartment is assigned to the first user. Confirmation of the assignment of the first user to the first compartment 404A may be displayed on the graphical user interface 414 of the first mobile device 412.

Figure 4C:
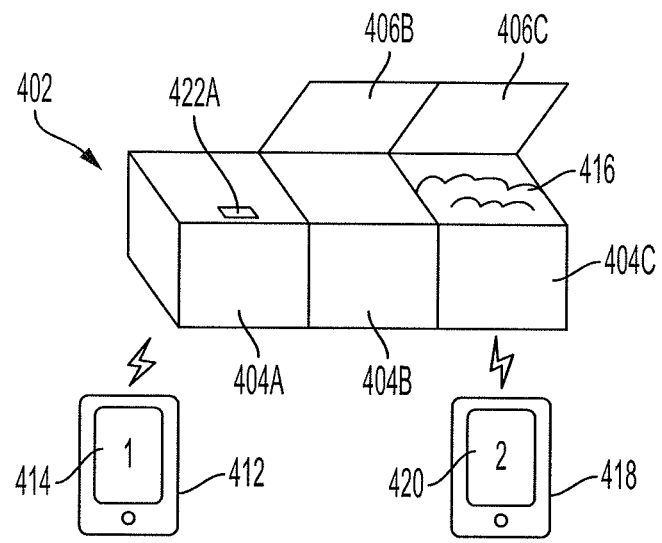

The first user may wish to close the first compartment 404A and lock the first compartment 404A to secure the items 410 within the first compartment 404A. As shown in FIG. 4C, the first lid 406A has been closed and the first compartment 404A is closed. In some embodiments, a first lock 422A associated with the first compartment 404A is engaged, locking the first compartment 404A. In some embodiments, the first lock 422A is not changed to a locked state until a locking communication to lock the first compartment 404A is communicated from the first mobile device 412 to the vehicle and/or the cargo carrier. Confirmation of the locking of the first compartment 404A may be displayed on the graphical user interface 414 of the first mobile device 412.

In a similar manner, a second user may place one or more items 416 in a second compartment 404C. The second user may use a second mobile device 418 that is configured to communicate with the vehicle and/or the cargo carrier. The second mobile device 418 may transmit an assignment communication identifying which compartment 404 the user of the second mobile device 418 would like to use to store the user's items 416 and identifying the second mobile device 418 or identifying the user. If the particular compartment identified by the second user via the second mobile device 418 is unoccupied or unassigned, the particular compartment is assigned to the second user. Confirmation of the assignment of the second user to the second compartment 404C may be displayed on the graphical user interface 420 of the second mobile device 418.

Figure 4D:
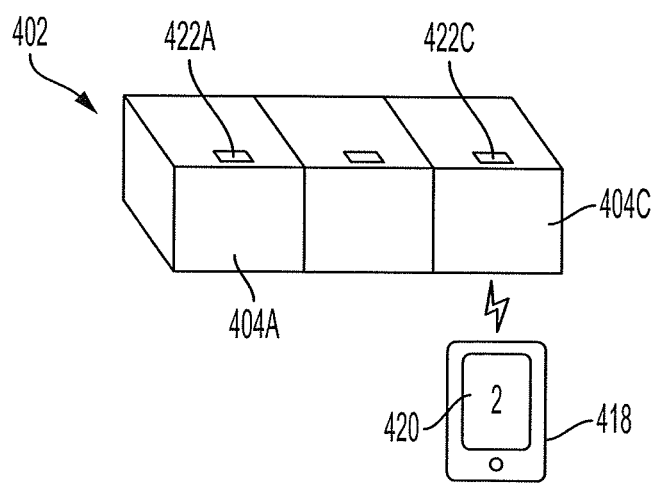

The second user may wish to close the second compartment 404C and lock the second compartment 404C to secure the items 416 within the second compartment 404C. As shown in FIG. 4D, the second lid 406C has been closed and the second compartment 404C is closed. In some embodiments, a second lock 422C associated with the second compartment 404C is engaged, locking the second compartment 404C. In some embodiments, the second lock 422C is not changed to a locked state until a locking communication to lock the second compartment 404C is communicated from the second mobile device 418 to the vehicle and/or the cargo carrier. Confirmation of the locking of the second compartment 404C may be displayed on the graphical user interface 420 of the second mobile device 418.

Figure 4E:
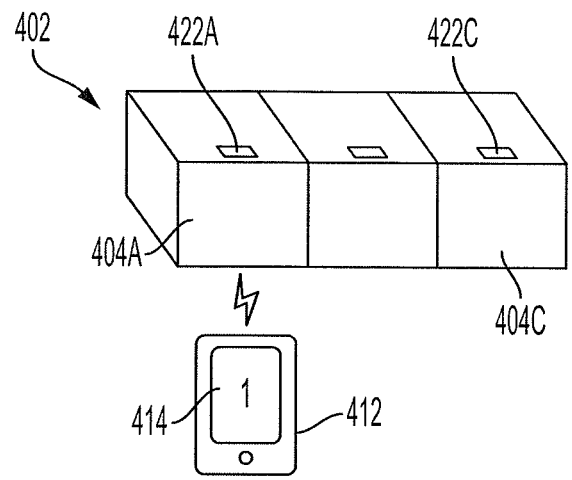

At a later time, the first user may desire to remove the items 410 from the first compartment 404A. As shown in FIG. 4E, the first mobile device 412 may be used to unlock the first compartment 404A. In some embodiments, the first user provides an indication on the graphical user interface 414 of the first mobile device 412 to unlock the first compartment 404A. The first mobile device 412 may transmit an unlocking communication to the vehicle and/or cargo carrier to unlock the first lock 422A for the first compartment 404A. The other compartments 404B and 404C may remain locked, as the first mobile device 412 is not authorized to unlock those compartments.

Figure 4F:
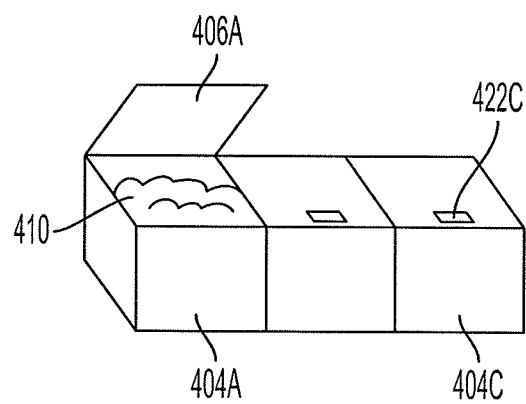

As shown in FIG. 4F, the first lid 406A is opened, and the one or more items 410 stored in the first compartment 404A are now accessible. In some embodiments, the association between the first mobile device 412 and the first compartment 404A is removed, and if the first user would like to lock the first compartment 404A again, the steps shown in FIGS. 4B and 4C may be repeated. In some embodiments, the association between the first mobile device 412 and the first compartment 404A remains until the first mobile device 412 provides a communication to remove the association. In some embodiments, when a time threshold of no interaction between the first mobile device 412 and the first compartment 404A is exceeded, the association between the first mobile device 412 and the first compartment 404A is automatically removed.

The association between a mobile device and a compartment may be stored in a memory of the vehicle, a memory of the cargo carrier, a remote server, and/or on multiple devices on a distributed ledger. In the association between the mobile device and a compartment, the mobile device may be identified by a globally unique identifier, such as a MAC address. The user may be identified by a globally unique identifier. The compartment may be identified by yet another identifier, which may also include an identifier of the vehicle and/or cargo carrier.

In some embodiments, the cargo carrier may have one large compartment or compartments that do not individually lock. FIGS. 5A-5H illustrate a process for monitoring access of a shared cargo carrier. The cargo carrier 502 has a single large compartment or multiple compartments that do not lock individually.

Figure 5A:
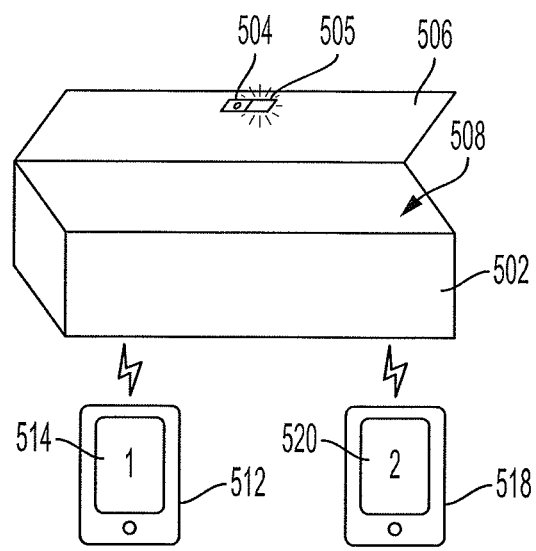
FIGS. 5A-5H illustrate use of the vehicle cargo carrier to monitor and regulate access to the vehicle cargo carrier by multiple users, according to various embodiments of the invention.

As shown in FIG. 5A, the cargo carrier 502 is in an open state and includes a cavity 508 and a lid 506. The lid 506 includes a camera 504 and a light 505. The camera 504 and/or the light 505 may automatically activate when the lid 506 is open or when the cargo carrier 502 is unlocked. The image data detected by the camera 504 may be stored in a memory of the cargo carrier 502. While FIG. 5A illustrates the camera 504 and the light 505 as being located on the lid 506, the camera 504 and the light 505 may be located in any location within the cavity 508 of the cargo carrier 502.

The cargo carrier 502 may be configured to communicate with multiple mobile devices (e.g., first mobile device 512 and second mobile device 518). The mobile devices may each transmit an access communication identifying the mobile device or an identifier of the user of the mobile device.

Each mobile device may perform one or more authentication steps to pair with the vehicle and/or the cargo carrier 502. These one or more authentication steps may include exchanging of tokens or encryption keys. Once the first mobile device 512 and the vehicle and/or cargo carrier 502 are configured to exchange data, the first mobile device 512 may use a graphical user interface 514 to lock and/or unlock the cargo carrier 502. Similarly, the second mobile device 518 may use a graphical user interface 520 to lock and/or unlock the cargo carrier 502.

Figure 5B:
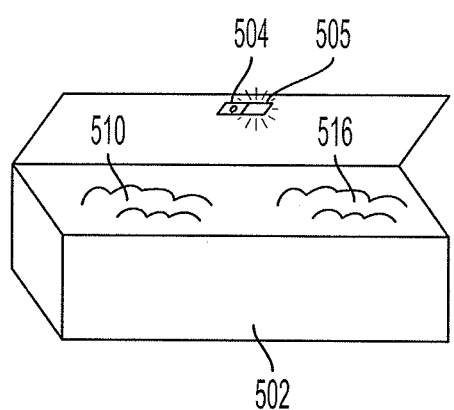

As shown in FIG. 5B, the cargo carrier 502 has a first set of items 510 placed in the cavity 508 and a second set of items 516 placed in the cavity. The first set of items 510 may be the property of a first user associated with the first mobile device 512, and the second set of items 516 may be the property of a second user associated with the second mobile device 518. The first user and the second user may be occupants of the vehicle that the cargo carrier 502 is attached to.

Figure 5C:
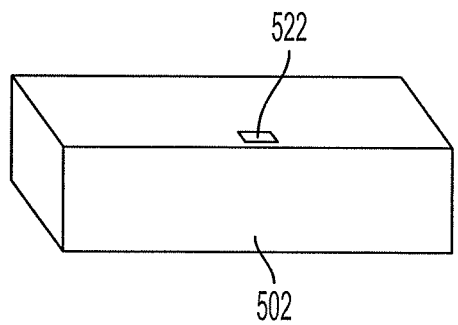

As shown in FIG. 5C, the cargo carrier 502 may be closed and locked using a lock 522. In some embodiments, the lock 522 is engaged when the lid 506 is closed, locking the cargo carrier 502. In some embodiments, the lock 522 is not changed to a locked state until a locking communication to lock the cargo carrier 502 is transmitted from the first mobile device 512 or the second mobile device 518 to the vehicle and/or the cargo carrier 502. Confirmation of the locking of the cargo carrier 502 may be displayed on the graphical user interface 514 of the first mobile device 512 and/or the graphical user interface 520 of the second mobile device 518.

Figure 5D:
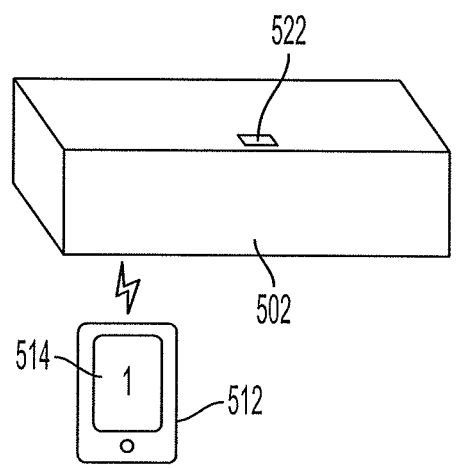

At a later time, the first user may desire to remove the items 510 from the cargo carrier 502. As shown in FIG. 5D, the first mobile device 512 may be used to unlock the cargo carrier 502. In some embodiments, the first user provides an indication on the graphical user interface 514 of the first mobile device 512 to unlock the cargo carrier 502. An unlocking communication is transmitted by the first mobile device 512 and received by the vehicle and/or the cargo carrier 502.

Figure 5E:
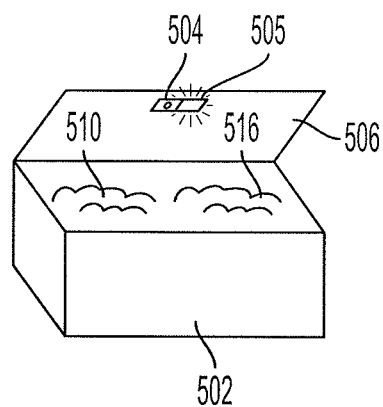

As shown in FIG. 5E, the lid 506 is opened, and the first set of items 510 and the second set of items 516 stored in the cargo carrier 502 are now accessible. As described herein, the camera 504 and/or the light 505 may activate. The presence of the camera 504 and/or the light 505 may serve as a deterrent for the first user (or any other individual) to steal the second set of items 516 belonging to the second user. If there is a theft of the second set of items 516, the camera 504 may record the theft, and the thief may be later identified using the image data.

Figure 5F:
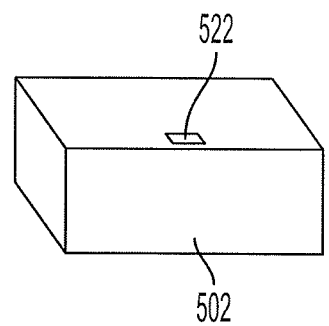

A portion of the first set of items 510 is removed. The cargo carrier 502 may be closed again, as shown in FIG. 5F, and the lock 522 may be engaged, as described herein.

Figure 5G:
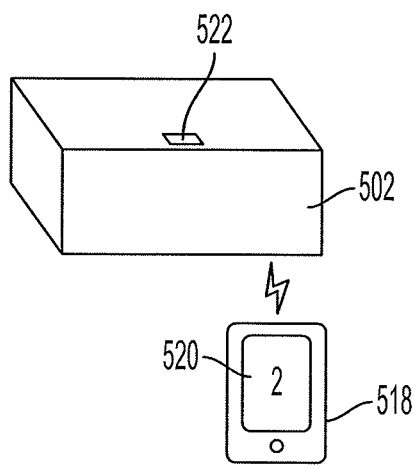

At a later time, the second user may desire to remove the items 516 from the cargo carrier 502. As shown in FIG. 5G, the second mobile device 518 may be used to unlock the cargo carrier 502. In some embodiments, the second user provides an indication on the graphical user interface 520 of the second mobile device 518 to unlock the cargo carrier 502. An unlocking communication is transmitted by the second mobile device 518 and received by the vehicle and/or the cargo carrier 502.

Figure 5H:
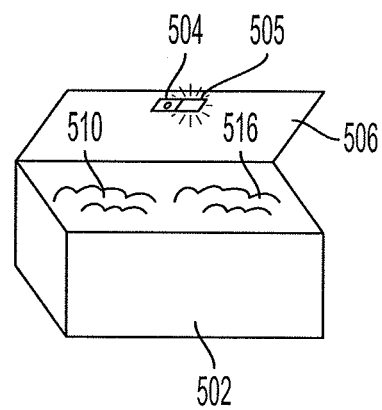

As shown in FIG. 5H, the lid 506 is opened, and the remaining portion of the first set of items 510 and the second set of items 516 stored in the cargo carrier 502 are now accessible. As described herein, the camera 504 and/or the light 505 may activate. The presence of the camera 504 and/or the light 505 may serve as a deterrent for the second user (or any other individual) to steal the items 510 belonging to the first user. If there is a theft of the items 510 belonging to the first user, the camera 504 may record the theft, and the thief may be later identified using the image data.

Figure 6:
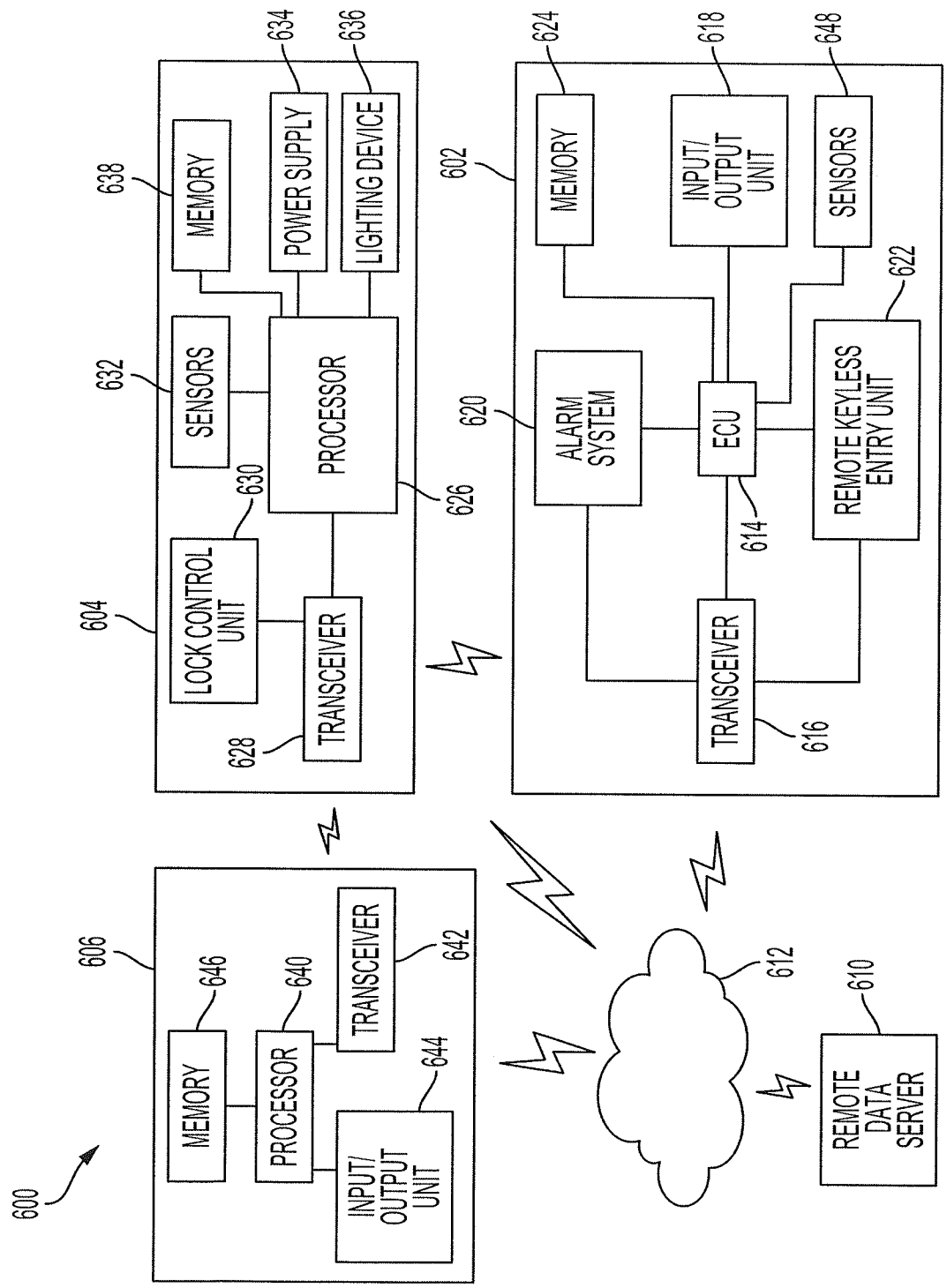
FIG. 6 illustrates the components of the system, according to various embodiments of the invention.

FIG. 6 illustrates a block diagram of the system 600. The system 600 includes a vehicle 602 (e.g., vehicle 102, 106), a cargo carrier 604 (e.g., cargo carrier 104, 105, 108), a remote data server 610, and a mobile device 606 (e.g., mobile device 412, 418, 512, 518).

The cargo carrier 604 may include a processor 626, a transceiver 628, a lock control unit 630, one or more sensors 632, a power supply 634, a lighting device 636, and a memory 638. In some embodiments, the components of the cargo carrier 604 are connected to each other using a communications bus.

The processor 626 (and any processors described herein) may be one or more computer processors configured to execute instructions stored on a non-transitory memory. The memory 638 may be a non-transitory memory configured to store data associated with the cargo carrier, such as sensor data, an assignment log indicating compartment and mobile device pairings, an access list indicating which mobile devices have access to the cargo carrier 604, and access log detailing unlocking and locking of any locks described herein by any mobile device. The access log may include a time a particular lock was locked or unlocked and an identifier of the mobile device that instructed the locking or unlocking.

The transceiver 628 (e.g., transceiver 117) may include a communication port or channel, such as one or more of a Wi-Fi unit, a Bluetooth® unit, a Radio Frequency Identification (RFID) tag or reader, a DSRC unit, a LORA unit, or a cellular network unit for accessing a cellular network (such as 3G, 4G, or 5G) or any other wireless technology. The transceiver 628 may transmit data to and receive data from devices and systems not physically connected to the vehicle. For example, the processor 626 may communicate with the remote data server 610, the vehicle 602, and/or the mobile device 606. Furthermore, the transceiver 628 may access the network 612, to which the remote data server 610, the vehicle 602, and/or the mobile device 606 are also connected.

The one or more sensors 632 (e.g., sensors 116) are configured to detect sensor data associated with the cargo carrier 604. The one or more sensors 632 may include one or more weight sensors configured to detect weight data associated with the cargo carrier 604. The weight data may be analyzed to determine whether the contents of the cargo carrier 104 have shifted significantly. The sensors 632 may also include a temperature sensor configured to detect temperature data within the cargo carrier 604. The temperature data may be used to determine whether a temperature inside of the cargo carrier 604 has exceeded a threshold temperature. The sensors 632 may also include an image sensor configured to detect image data within the cargo carrier 604. The image data may be used to visually monitor the interior of the cargo carrier 604 and/or to visually monitor who has accessed the cargo carrier 604. The sensors 632 may also include a lock sensor configured to detect whether the cargo carrier 604 is in a locked or unlocked state. The lock sensor may also be configured to detect tampering with any of the locks in an effort to open the cargo carrier 604 or any compartments of the cargo carrier 604. The sensors 632 may also include an opening sensor configured to detect whether the cargo carrier 604 is open or closed. The sensors 632 may also include a moisture sensor configured to detect moisture data within the cargo carrier 604. The moisture data may be used to determine whether any moisture is affecting the contents of the cargo carrier 604.

The lock control unit 630 is configured to lock and unlock the various locks (e.g., lock 140, 125, 206, 208, 304, 306) of the cargo carrier 604. In some embodiments, the lock control unit 630 is configured to change a state of each lock of the cargo carrier 604 between a locked state and an unlocked state. The lock control unit 630 may receive an instruction from the processor 626 to lock or unlock any of the locks, and the lock control unit 630 may also provide lock status data to the processor 626 for any of the locks. The lock control unit 630 may also be configured to detect attempted or actual unauthorized entry into the cargo carrier 604 or any compartment thereof. The lock control unit 630 may use one or more lock sensors as described herein.

The power supply 634 may be configured to power the components of the cargo carrier 604. The power supply 634 may include a battery and a power receiving device. The power receiving device may be a plug for receiving electricity from a power source, such as a power outlet. The power receiving device may be a solar panel array for converting light energy into electrical energy. The power receiving device may be an induction device for receiving electricity from a corresponding inductive power device of the vehicle 602.

The lighting device 636 may be a light configured to provide illumination. The lighting device 636 may be located on an interior cavity (e.g., interior cavity 210) of the cargo carrier 604 or may be located within a compartment (e.g., compartment 204, 304, 404) of the cargo carrier 604. The processor 626 may instruct the lighting device 636 to activate in various conditions. For example, the processor 626 may instruct the lighting device 636 to activate when the image sensor (e.g., a camera or video camera) is detecting image data. In another example, the processor 626 may instruct the lighting device 636 to activate when the cargo carrier 604 is open.

The vehicle 602 is a conveyance capable of transporting a person, an object, or a permanently or temporarily affixed apparatus. The vehicle 602 may have an automatic or manual transmission. The vehicle 602 may be a self-propelled wheeled conveyance, such as a car, a sports utility vehicle, a truck, a bus, a van or other motor or battery driven vehicle. For example, the vehicle 602 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 602 may be semi-autonomous vehicle or an autonomous vehicle. That is, the vehicle 602 may be self-maneuvering and navigate without human input. An autonomous vehicle may use one or more sensors and/or a navigation unit to drive autonomously.

The vehicle 602 includes an ECU 614 connected to a transceiver 616, sensors 648, a memory 624, an alarm system 620, a remote keyless entry unit 622, and an input/output unit 618. In some embodiments, each of the elements of the vehicle 602 are connected via a communications bus.

The ECU 614 may be one or more ECUs, appropriately programmed, to control one or more operations of the vehicle. The one or more ECUs 614 may be implemented as a single ECU or in multiple ECUs. The ECU 614 may be electrically coupled to some or all of the components of the vehicle. In some embodiments, the ECU 614 is a central ECU configured to control one or more operations of the entire vehicle. In some embodiments, the ECU 614 is multiple ECUs located within the vehicle and each configured to control one or more local operations of the vehicle. In some embodiments, the ECU 614 is one or more computer processors or controllers configured to execute instructions stored in a non-transitory memory 624.

The sensors 648 may include one or more image sensors configured to detect image data of the environment around the vehicle 602. The image data may be used to determine individuals who accessed the cargo carrier 604. The image sensor may be a camera or video camera.

The sensors 648 may also include a location sensor configured to detect location data associated with the vehicle 602. The ECU 614 may use the location data along with map data stored in memory 624 to determine a location of the vehicle. In some embodiments, the location sensor has access to the map data and may determine the location of the vehicle and provide the location of the vehicle to the ECU 614. The location sensor may be a GPS unit or any other global location detection device. The location data may be used to track the location of the vehicle 602 and the cargo carrier 604.

The vehicle 602 may be coupled to a network. The network, such as a local area network (LAN), a wide area network (WAN), a cellular network, a digital short-range communication (DSRC), LORA (Long Range), the Internet, or any other type of interconnectivity or combinations thereof, connects the vehicle 602 to other devices, such as a remote data server 610, the cargo carrier 604, and/or the mobile device 606.

The transceiver 616 may be configured to transmit and receive data, similar to the transceiver 628. The transceiver 616 may receive various communications from the mobile device 606 (e.g., assignment communications, unlocking communications, locking communications, access communications) and the transceiver 616 may relay the received communications from the mobile device 606 to the cargo carrier 604.

The memory 624 is connected to the ECU 614 and may be connected to any other component of the vehicle. The memory 624 is configured to store any data described herein, such as the assignment log indicating compartment and mobile device pairings, the access list indicating which mobile devices have access to the cargo carrier 604, the access log, any thresholds (e.g., time thresholds and/or distance thresholds) and any data received from the remote data server 610 via the transceiver 616.

The alarm system (or alarm unit) 620 is configured to create an audible and/or visual alert to attract attention to the vehicle 602. The alarm system 620 may be activated by the ECU 614 when the ECU determines that one or more locks of the cargo carrier 604 are being tampered with. The lock control unit 630 of the cargo carrier 604 may communicate an indication to the processor 626 of the cargo carrier 604 that one or more locks of the cargo carrier 604 are being tampered with. The processor 626 of the cargo carrier 604 may communicate an indication to the ECU 614 (via the transceiver 628 of the cargo carrier 604 and the transceiver 616 of the vehicle 602) that the one or more locks of the cargo carrier 604 are being tampered with. The ECU 614 may communicate a signal to the alarm system 620 to cause the alarm system 620 to generate an audible and/or visual alert.

The remote keyless entry unit 622 is configured to receive a signal from a keyfob or the mobile device 606 to lock or unlock any of the locks described herein, including locks of the vehicle 602 and locks of the cargo carrier 604. The remote keyless entry unit 622 may receive a signal from a keyfob or the mobile device 606 and communicate a signal to the cargo carrier 604 (via the transceiver 616 of the vehicle 602 and the transceiver 628 of the cargo carrier 604) to lock or unlock a particular lock of the cargo carrier 604. The lock control unit 630 may receive the signal and lock or unlock the identified lock of the cargo carrier 604.

The input/output unit 618 may be a touchscreen display or a display screen and an input device, such as a keyboard, microphone, or buttons. The input/output unit 618 may be a touchscreen of an infotainment unit of the vehicle 602, a heads-up display, or a combination of a display screen of the infotainment unit and one or more buttons or knobs used to interact with the infotainment unit. The ECU 614 may be configured to render a graphical user interface to facilitate displaying of cargo carrier information, such as a lock status of the cargo carrier 604 or any information based on the sensor data described herein. The graphical user interface may also facilitate locking and unlocking of locks of the cargo carrier 604.

The remote data server 610 may store the assignment log indicating compartment and mobile device pairings, the access list indicating which mobile devices have access to the cargo carrier 604, and the access log. The mobile device 606 may use the remote data server 610 to facilitate communication with the cargo carrier 604. The mobile device 606 may also use the remote data server 610 to facilitate communication with the vehicle 602. Similarly, the vehicle 602 may use the remote data server 610 to facilitate communication with the cargo carrier 604. The remote data server 610 may also receive and store any sensor data detected by the sensors of the cargo carrier. The remote data server 610 may automatically analyze the sensor data and provide analysis to the vehicle and/or the cargo carrier. For example, the remote data server 610 may automatically analyze image data detected when the cargo carrier is opened, and may determine a user identity based on facial recognition technology, and the determined user identity may be communicated to the vehicle and/or cargo carrier.

The mobile device 606 (e.g., mobile device 412, 418, 512, 518) includes a processor 640, a memory 646, a transceiver 642, and an input/output unit 644, which may all be connected to each other via a communications bus. The processor 640 may be one or more computer processors configured to execute instructions stored on the non-transitory memory 646. The memory 646 may be a non-transitory memory configured to store data. The transceiver 642 may be configured to transmit and receive data, similar to transceivers 616 and 628. The input/output unit 644 may include a touchscreen display or a display screen and an input device, such as a keyboard, microphone, or buttons.

The processor of the mobile device 606 may be configured to render a graphical user interface (e.g., graphical user interface 414, 420, 514, 520) to facilitate displaying of compartment information, such as an identification of which compartment the user's items are stored in, an identification of which vehicle the cargo carrier having the user's items is attached to, and/or a length of time the user's items have been stored in the compartment. The graphical user interface may also facilitate pairing of the mobile device 606 with the vehicle 602 and/or the cargo carrier 604. The graphical user interface may also facilitate locking and unlocking of compartments in the cargo carrier 604, locking and unlocking of the cargo carrier 604 itself, and/or locking and unlocking of the locks for securing the cargo carrier 604 to the vehicle 602. In some embodiments, a keyfob of the vehicle 602 may be programmed to perform the unlocking and locking functions of the mobile device 606 described herein.

While only one remote data server 610 is shown, any number of remote data servers in communication with each other may be used. Multiple remote data servers may be used to increase the memory capacity of the data being stored across the remote data servers, or to increase the computing efficiency of the remote data servers by distributing the computing load across the multiple remote data servers. Multiple remote data servers may be interconnected using any type of network, or the Internet.

As used herein, a "unit" may refer to hardware components, such as one or more computer processors, controllers, or computing devices configured to execute instructions stored in a non-transitory memory.

Figure 7:
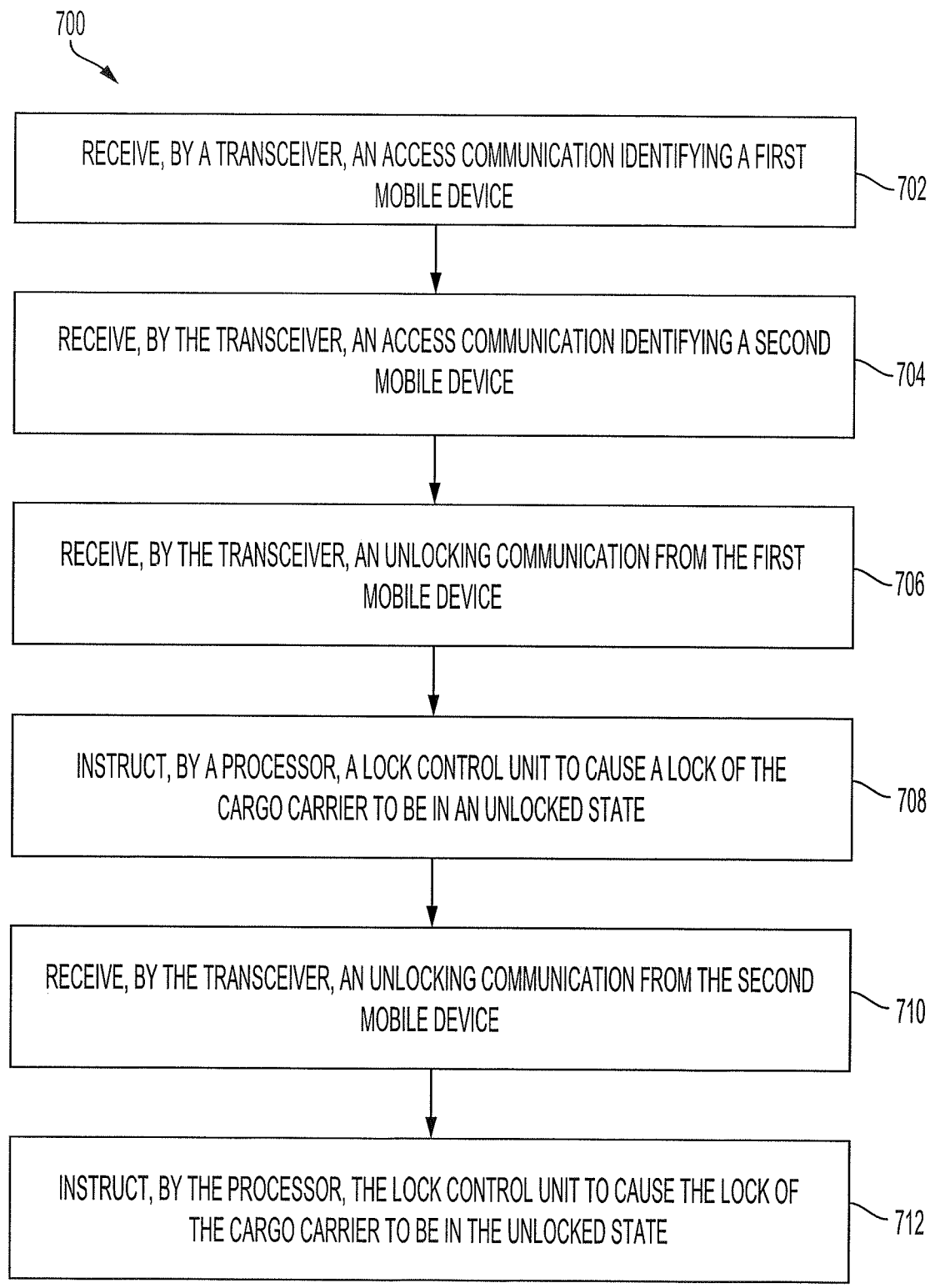
FIG. 7 illustrates a flow diagram of a process for managing access to the cargo carrier, according to various embodiments of the invention.

FIG. 7 is a flow diagram of a process 700 for managing access to a cargo carrier (e.g., cargo carrier 604) attached to an exterior of a vehicle (e.g., vehicle 602).

A transceiver (e.g., transceiver 628) of the cargo carrier receives an access communication identifying a first mobile device (e.g., mobile device 606) (step 702). The access communication may include a globally unique identifier of the first mobile device. In some embodiments, granting of access to the first mobile device may be facilitated using an access code.

The transceiver of the cargo carrier receives another access communication identifying a second mobile device (e.g., mobile device 606) (step 704). The access communication may include a globally unique identifier of the second mobile device. In some embodiments, granting of access to the second mobile device may be facilitated using an access code.

A memory (e.g., memory 638) may store a list of mobile devices that have been granted access to lock and unlock the cargo carrier. The list of mobile devices may be updated by a processor (e.g., processor 626) to show the first mobile device and the second mobile device having access to lock and unlock the cargo carrier.

The transceiver of the cargo carrier receives an unlocking communication from the first mobile device (step 706). The unlocking communication may be transmitted from the first mobile device using a transceiver (e.g., transceiver 642) and received by the cargo carrier. In some embodiments, the unlocking communication is transmitted from the first mobile device to the vehicle, and the vehicle relays the unlocking communication to the cargo carrier using a transceiver (e.g., transceiver 616).

The processor of the cargo carrier instructs a lock control unit (e.g., lock control unit 630) to cause a lock (e.g., lock 522) of the cargo carrier to be in an unlocked state (step 708). The lock may secure access to the cargo carrier. An access log stored in the memory of the cargo carrier may be updated to indicate a time of the first mobile device requesting unlocking of the cargo carrier. The first mobile device may then transmit a locking communication that causes the lock to be in a locked state. In some embodiments, the lock automatically locks upon closing of a lid of the cargo carrier.

The transceiver of the cargo carrier receives an unlocking communication from the second mobile device (step 710). The unlocking communication may be transmitted from the second mobile device using a transceiver (e.g., transceiver 642) and received by the cargo carrier. In some embodiments, the unlocking communication is transmitted from the second mobile device to the vehicle, and the vehicle relays the unlocking communication to the cargo carrier using a transceiver (e.g., transceiver 616).

The processor of the cargo carrier instructs the lock control unit to cause the lock of the cargo carrier to be in an unlocked state (step 712). The access log stored in the memory of the cargo carrier may be updated to indicate a time of the second mobile device requesting unlocking of the cargo carrier. As described herein, the lock control unit may detect unauthorized entry into the cargo carrier and the processor of the cargo carrier may communicate an indication to the vehicle to activate an alarm of the vehicle. The alarm of the vehicle may be part of an alarm system (e.g., alarm system 620).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A cargo carrier for attaching to an exterior of a vehicle, the cargo carrier comprising:
   a plurality of compartments configured to store one or more items;
   a respective plurality of locks corresponding to the plurality of compartments, each lock configured to secure a respective compartment;
   a lock control unit configured to lock or unlock any lock of the plurality of locks, and detect unauthorized entry into any compartment from the plurality of compartments; and
   a processor connected to the lock control unit and configured to:
      receive an assignment communication via a transceiver identifying a mobile device and a compartment from the plurality of compartments,
      associate the compartment and the mobile device when the compartment is unassigned,
      receive an unlocking communication via the transceiver to unlock the compartment,
      transmit a communication to the lock control unit to unlock the compartment, and
      communicate an indication to the vehicle to activate an alarm of the vehicle when the lock control unit detects unauthorized entry into any compartment.

2. The cargo carrier of claim 1, wherein the processor is further configured to determine whether the compartment identified in the assignment communication from the mobile device is assigned or unassigned.

3. The cargo carrier of claim 2, further comprising a memory configured to store an assignment log associating each compartment with a mobile device identification or a user identification, and
   wherein the processor accesses the assignment log to determine whether the compartment identified in the assignment communication from the mobile device is assigned or unassigned.

4. The cargo carrier of claim 1, wherein the processor is further configured to receive a locking communication via the transceiver to lock the compartment, and send a communication to the lock control unit to lock the compartment.

5. The cargo carrier of claim 1, wherein the assignment communication and the unlocking communication are received by the transceiver from the mobile device.

6. The cargo carrier of claim 1, wherein the assignment communication and/or the unlocking communication are received by the transceiver from the vehicle.

7. The cargo carrier of claim 1, further comprising a memory configured to store an access log indicating, for each compartment, when the compartment was unlocked and a user identification or a mobile device identification associated with the unlocking, and
   wherein the processor is further configured to update the access log when the compartment is unlocked.

8. The cargo carrier of claim 1, further comprising an image sensor configured to detect image data when one or more compartments of the plurality of compartments are unlocked.

9. The cargo carrier of claim 1, further comprising a plurality of image sensors corresponding to the plurality of compartments, each image sensor configured to detect image data when a respective compartment is unlocked.

10. A cargo carrier for attaching to an exterior of a vehicle, the cargo carrier comprising:
   an interior cavity for storing one or more items;
   a lock configured to secure the interior cavity and be in a locked state or an unlocked state;
   a lock control unit configured to lock or unlock the lock, and detect unauthorized entry into the interior cavity;
   a processor connected to the lock control unit and configured to:
      receive an access communication via a transceiver identifying a first mobile device,
      receive an access communication via the transceiver identifying a second mobile device,
      receive an unlocking communication from the first mobile device,
      transmit a communication to the lock control unit to cause the lock to be in the unlocked state to allow the interior cavity to be exposed, receive an unlocking communication from the second mobile device, transmit a communication to the lock control unit to cause the lock to be in the unlocked state to allow the interior cavity to be exposed, and communicate an indication to the vehicle to activate an alarm of the vehicle when the lock control unit detects unauthorized entry into the interior cavity.

11. The cargo carrier of claim 10, wherein the processor is further configured to receive a locking communication via the transceiver from the first mobile device or the second mobile device, and send a communication to the lock control unit to cause the lock to be in the locked state.

12. The cargo carrier of claim 10, further comprising a memory configured to store an access log indicating when the lock was unlocked and a user identification or a mobile device identification associated with the unlocking, and wherein the processor is further configured to update the access log when the compartment is unlocked.

13. The cargo carrier of claim 10, further comprising an image sensor configured to detect image data when the lock is unlocked.

14. A method for managing access to a cargo carrier attached to an exterior of a vehicle, the method comprising:

receiving, by a transceiver, an access communication identifying a first mobile device;

receiving, by the transceiver, an access communication identifying a second mobile device;

receiving, by the transceiver, an unlocking communication from the first mobile device;

instructing, by a processor, a lock control unit to cause a lock of the cargo carrier to be in an unlocked state;

receiving, by the transceiver, an unlocking communication from the second mobile device;

instructing, by the processor, the lock control unit to cause the lock of the cargo carrier to be in the unlocked state;

detecting, by the lock control unit, unauthorized entry into the cargo carrier; and communicating, by the processor, an indication to the vehicle to activate an alarm of the vehicle.

15. The method of claim 14, further comprising receiving, by the transceiver, a locking communication from the first mobile device or the second mobile device; and instructing, by the processor, the lock control unit to cause the lock of the cargo carrier to be in the locked state.

16. The method of claim 14, further comprising storing, by a memory, an access log indicating when the lock was unlocked and a user identification or a mobile device identification associated with the unlocking; and updating, by the processor, the access log when the cargo carrier is unlocked.

17. The method of claim 14, further comprising detecting, by an image sensor image data when the lock is unlocked.

* * * * *